(12) United States Patent
Khabashesku et al.

(10) Patent No.: US 7,919,641 B2
(45) Date of Patent: Apr. 5, 2011

(54) SYNTHESIS OF STYRENE-SOLUBLE IONIC COMONOMER

(75) Inventors: Olga Khabashesku, Houston, TX (US); Billy Ellis, Georgetown, TX (US)

(73) Assignee: Fina Technology, Inc., Houston, TX (US)

( * ) Notice: Subject to any disclaimer, the term of this patent is extended or adjusted under 35 U.S.C. 154(b) by 78 days.

(21) Appl. No.: 12/346,743

(22) Filed: Dec. 30, 2008

(65) Prior Publication Data

US 2010/0162826 A1 Jul. 1, 2010

(51) Int. Cl.
*C07F 3/06* (2006.01)
*C08F 4/06* (2006.01)

(52) U.S. Cl. ....................... 556/131; 526/192
(58) Field of Classification Search ............ 556/131; 526/192

See application file for complete search history.

(56) References Cited

U.S. PATENT DOCUMENTS

| | | | |
|---|---|---|---|
| 3,966,902 A | 6/1976 | Chromecek | |
| 4,278,735 A | 7/1981 | Marcantonio et al. | |
| 4,500,466 A | 2/1985 | Hayes et al. | |
| 4,730,067 A | 3/1988 | Filachek et al. | |
| 4,766,174 A | 8/1988 | Statz | |
| 4,895,827 A | 1/1990 | Vervacke et al. | |
| 4,933,405 A | 6/1990 | Evani | |
| 5,120,794 A | 6/1992 | Oberster et al. | |
| 5,202,363 A | 4/1993 | Oberster et al. | |
| 5,540,813 A | 7/1996 | Sosa et al. | |
| 5,597,879 A | 1/1997 | Ase et al. | |
| 5,616,681 A | 4/1997 | Itoh et al. | |
| 5,721,009 A | 2/1998 | Dougherty et al. | |
| 5,756,586 A | 5/1998 | Nishimura et al. | |
| 5,844,039 A | 12/1998 | Scranton et al. | |
| 6,194,504 B1 | 2/2001 | Nagel et al. | |
| 7,179,873 B2 | 2/2007 | Reimers et al. | |

| | | |
|---|---|---|
| 2003/0073792 A1 | 4/2003 | Moore |
| 2004/0048987 A1 | 3/2004 | Campbell et al. |
| 2006/0167149 A1 | 7/2006 | Reimers et al. |
| 2008/0051540 A1 | 2/2008 | Reimers et al. |

OTHER PUBLICATIONS

Eisenberg et al., Macromolecules, vol. 23, No. 18, pp. 4098-4107 (1990).*
Eisenberg, A., Kim, J.S., "Introduction to Ionomers", Wiley Interscience, 1998, New York, NY.*
Gotoh, Y. et al., "Preparation and Viscoelastic Behavior of Methacrylate Ionomers Crosslinked by Titanium (IV), Zirconium (IV), and Nb (V) Ions", Polymer Journal, vol. 36, No. 3, pp. 255-260 (2000).*
Veyland, A. et al., "Aqueous Chemistry of Zirconium (VI) in Carbonate Media", Helvetica Chimica Acta, vol. 83, pp. 414-427 (2000).*
Yuan X. et al., "In-situ Preparation of Zinc Unsaturated Carboxylic Acids Salts to Reiforce NBR", Journal of Applied Polymer Science, vol. 77, Issue 12, pp. 2740-2748 (2000).*
Yuan X. et al., "In-situ Preparation of Magnesium methacrylate to Reiforce NBR", Journal of Applied Polymer Science, vol. 84, Issue 7, pp. 1403-1408 (2002).*
I. Capek, "Nature and Properties of Ionomers Assemblies", Advances in Colloid and Interface Science, vol. 118, pp. 73-112 (2005).*
Dennes et al., Journal of the American Chemical Society, vol. 129, No. 1, pp. 93-97 (2007).*
U.S. Appl. No. 12/346,729, filed Dec. 30, 2008, Khabashesku et al.
U.S. Appl. No. 12/346,739, filed Dec. 30, 2008, Khabashesku et al.
Kickelbick et al., J. Chem. Soc., Dalton Trans. vol. 20, pp. 3892-3898 (2002).

* cited by examiner

*Primary Examiner* — Porfirio Nazario Gonzalez
(74) *Attorney, Agent, or Firm* — Bradley A. Misley

(57) ABSTRACT

A method for the in-situ preparation of an ionic comonomer, such as zinc dimethacrylate, dissolved in styrene monomer, for use in production of polystyrene is disclosed. The method generally includes adding comonomer chemical precursors to a solution of styrene and nonionic surfactant. The resulting ionic comonomer may be further dissolved in styrene and polymerized to form a product that may have improved properties.

14 Claims, 8 Drawing Sheets

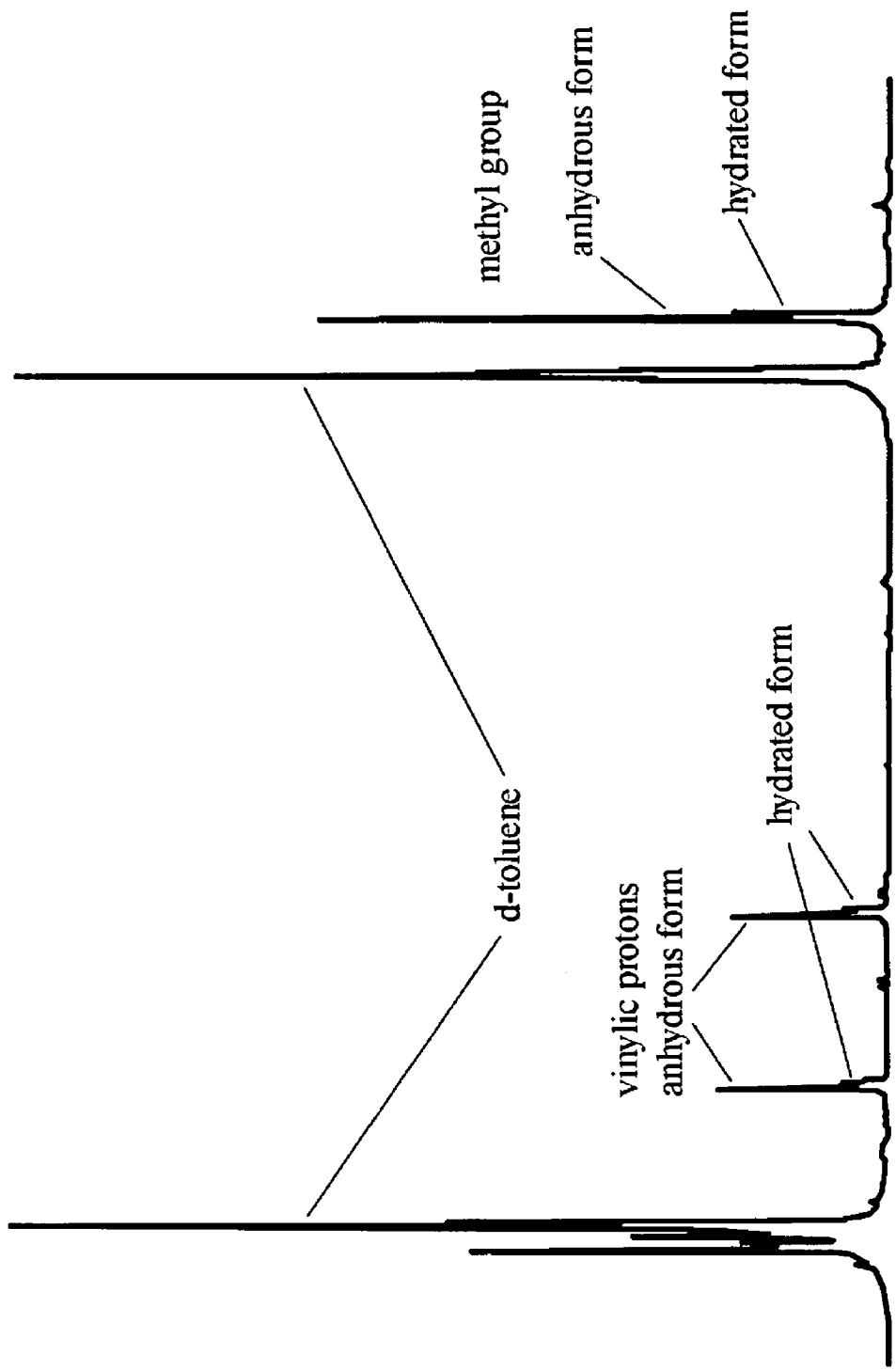

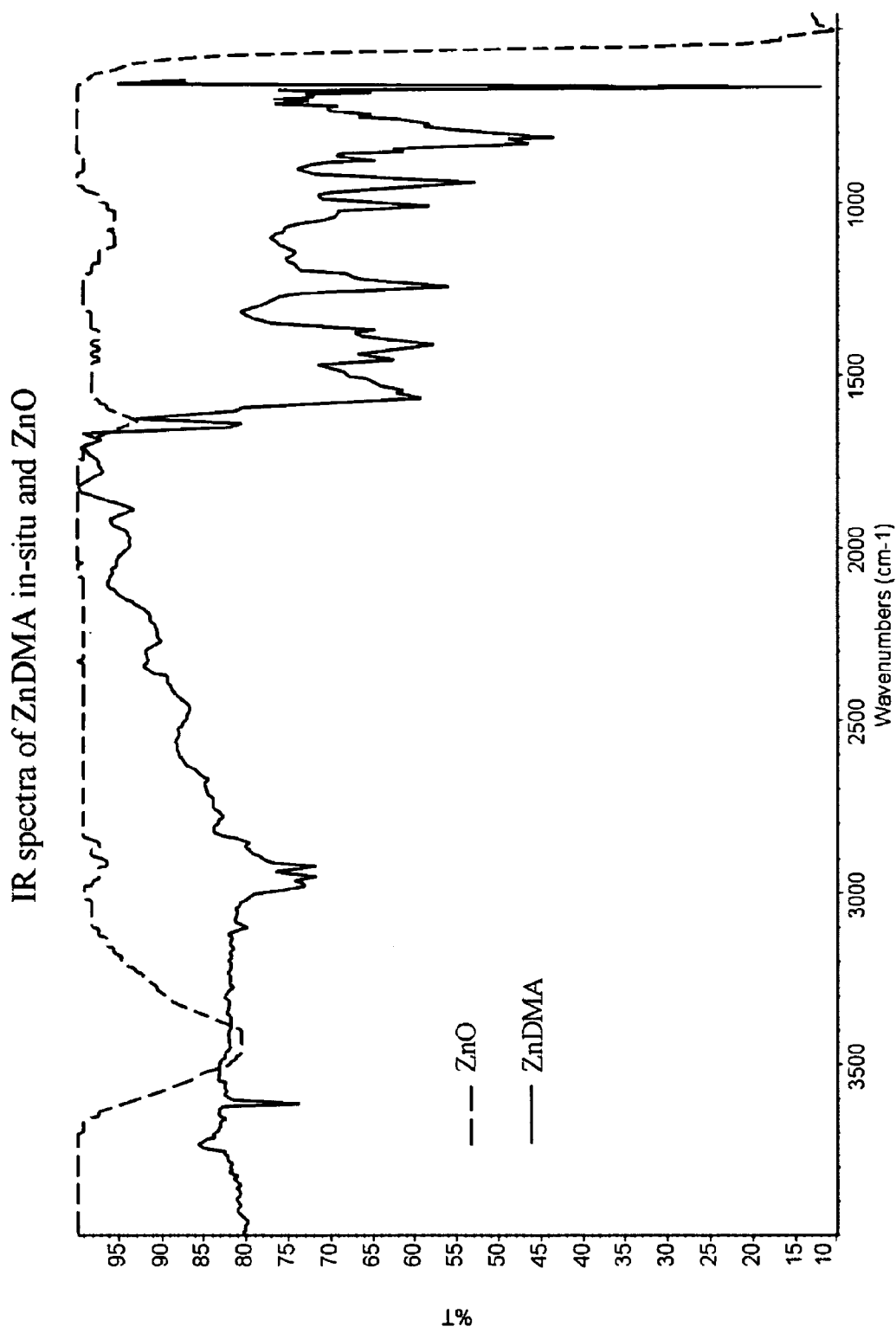

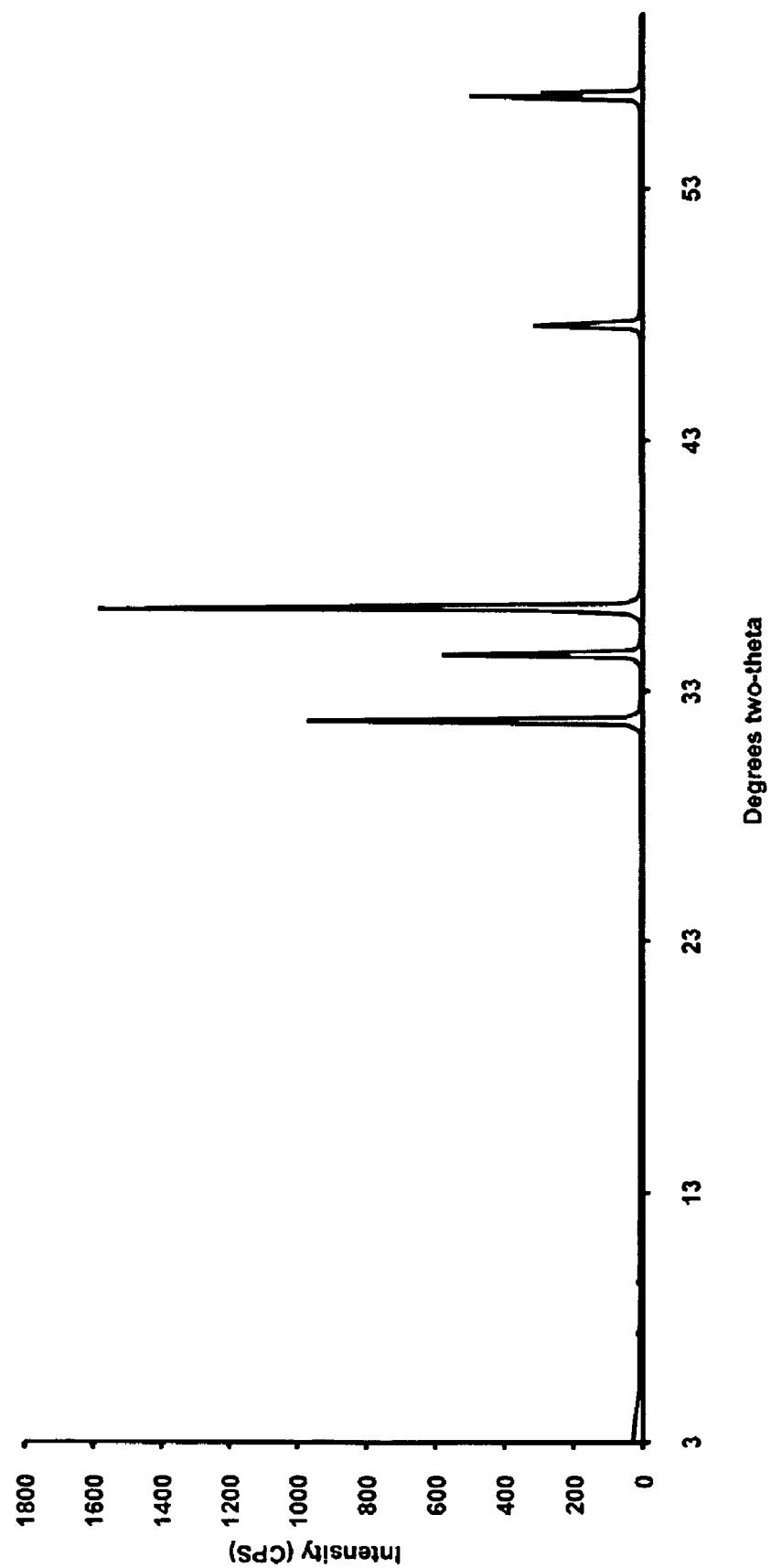

XRD spectra of ZnDMA in-situ prep

XRD spectra of commercial ZnDMA

Melt flow rate of ZnDMA containing GPPS batch samples

Melt Strength of ZnDMA containing GPPS batch samples

Correlation between melt flow rate and melt strength for ZnDMA containing GPPS batch samples

SYNTHESIS OF STYRENE-SOLUBLE IONIC COMONOMER

CROSS-REFERENCE TO RELATED APPLICATIONS

Not applicable.

FIELD

The present invention generally relates to the production of ionic comonomers for use in the production of polystyrene.

BACKGROUND

Polystyrene, such as general purpose polystyrene (GPPS), is made from styrene, a vinyl aromatic monomer that can be produced from aromatic hydrocarbons, for example those derived from petroleum. GPPS is useful in a variety of applications, such as casing for appliances, molded into toys or utensils, or expanded to create foamed styrene. In most cases, GPPS is a hard and brittle plastic, however, the use of comonomers may alter its physical properties, for example, styrene can be copolymerized with polybutadiene to make SBS rubber. The resulting SBS polymer has more rubber-like qualities, such as elastomeric performance and abrasion resistance. Other polymers can also experience altered physical properties when polymerized using comonomers. Ionic comonomers, for example, may alter properties such as melt flow rate, melt strength, polydispersity, and glass transition temperature.

When ionic comonomers are used, the polymer product is an ionomer. An ionomer is a polymer that contains nonionic repeating units and a small portion of ionic repeating units. Generally, the ionic groups make up less than 15% of the polymer. The ionic groups are attached to the polymer backbone at random intervals and can reversibly associate with one another, creating reversible crosslinks. These reversible crosslinks can cause the polystyrene to be less brittle and more resistant to abrasions. Ionic aggregates in the copolymer can also affect such properties as bending modulus, tensile strength, impact resistance, and melt viscosity.

Unsaturated carboxylic acid salts are a group of ionic comonomers that can serve as effective crosslinking agents. Metal methacrylates are an example of carboxylic acid salts. One metal methacrylate that may be useful as an ionomeric crosslinker is zinc dimethacrylate, $Zn(MA)_2$ or ZnDMA. It is a divalent metal and therefore, capable of forming two reversible crosslinks with the ionized acid ends of the methacrylates that are incorporated into the backbones of polystyrene chains.

Zinc methacrylates can be obtained commercially in a powder form or prepared from precursors via a variety of methods. These methods are rather labor-intensive and expensive, and the resulting ZnDMA powder may contain unwanted insoluble impurities. Further, particles of ZnDMA powder tend to be less than 10 microns in diameter, causing inhalation hazards during transport to the reaction vessel due to dust. Further, ZnDMA is polar, and therefore does not easily dissolve into styrene. In the reaction vessel, sticking of the methacrylate particles to the vessel surfaces can occur during mixing due to the static charge build-up on the surface of these polar compounds. Thus, for all of the above reasons, preparation of a ZnDMA powder may not be the best option for incorporating this ionic comonomer into polystyrene production.

It would be desirable to have a technique for the in-situ preparation of ZnDMA as a comonomer in the production of GPPS that would be reproducible, yield a fluid suspension that is readily pumpable and pourable, and give GPPS enhanced physical properties such as high melt strength.

SUMMARY

Embodiments of the present invention generally include a method for the in-situ preparation of an ionic comonomer from its chemical precursors, formed in a solution of styrene monomer. The method generally involves adding chemical precursors to a reaction vessel containing styrene monomer, allowing the comonomer to form and dissolve in the styrene monomer either by stirring or exposing to elevated temperatures, removing unwanted side products, and diluting the solution with styrene until a mixture useful for styrene polymerization is obtained.

Embodiments of the present invention generally include a method for the in-situ preparation of a zinc based methacrylate dissolved in styrene monomer. The zinc methacrylate product may then be used as an ionic comonomer for the production of polystyrene, such as general purpose polystyrene. The method of in-situ preparation generally includes combining zinc oxide and methacrylic acid in a solution of styrene monomer and nonionic surfactant, and stirring until dissolved, allowing for the formation of an ionic comonomer that is soluble in styrene.

In one embodiment, the ionic comonomer is zinc dimethacrylate. According to the same embodiment, the chemical precursors used are zinc oxide, ZnO, and methacrylic acid, $CH_2=C(CH_3)-COOH$. The precursors can be added to the styrene monomer in a zinc to methacrylic acid molar ratio from 1:1 to 1:10.

Zinc oxide and methacrylic acid can be added in a molar ratio of approximately 1 molar equivalent of zinc per two molar equivalents of methacrylic acid, such that the reaction product is zinc dimethacrylate. Zinc dimethacrylate can function as an ionic comonomer and a crosslinking agent in the polymerization of styrene. Because zinc is a divalent metal, it can form up to two reversible crosslinks with the ionized acid ends of methacrylate which are incorporated into polystyrene chains. In-situ formed zinc dimethacrylate can be added to styrene monomer, resulting in a reaction mixture that is pumpable and pourable and can be easily transported to the reaction chamber. The reaction mixture may be polymerized via any method known in the art. The resulting polymer may have increased melt strength and glass transition temperature.

Water produced as an unwanted side product can be removed from the first product, such as by draining and/or by passing the reaction mixture through a dehydration process. The water produced as an unwanted side product can also be removed from the first product by passing the reaction mixture over an alumina bed. An embodiment of the invention can be a polymer containing an ionic comonomer produced according to the method, such as a polystyrene polymerized with an in-situ formed ionic comonomer and can be an article made from a the polystyrene.

BRIEF DESCRIPTION OF DRAWINGS

FIG. 1 illustrates a proton NMR spectrum of ZnDMA produced according to the method of the present invention.

FIG. 2 illustrates an infrared spectrum of the ZnDMA produced according to the method of the present invention, with the spectrum of ZnO superimposed.

FIG. 3a-3c illustrates XRD spectra of ZnO, ZnDMA produced according to the method of the present invention, and commercially obtained ZnDMA.

DETAILED DESCRIPTION

Figure 3B:
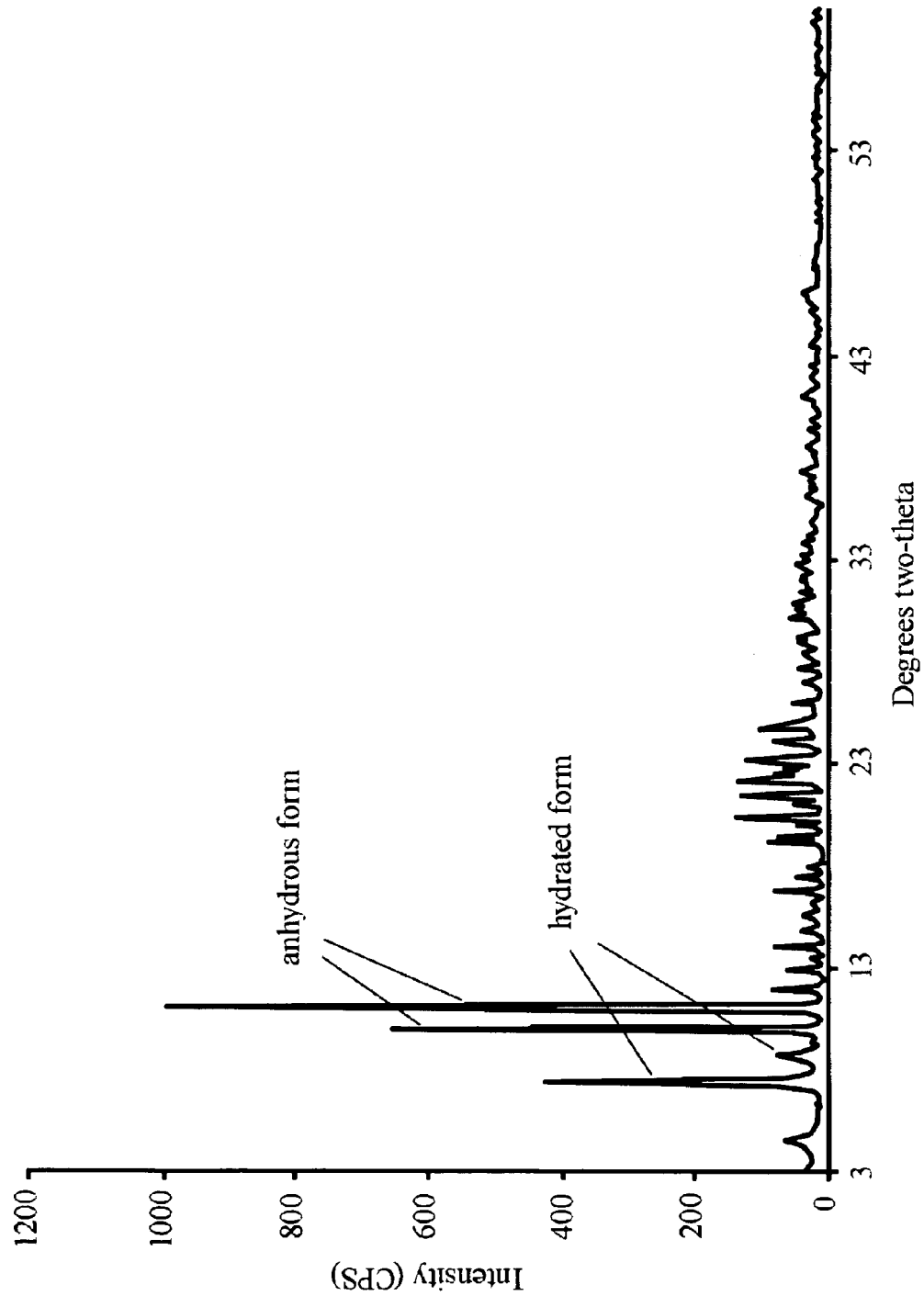

Embodiments of the present invention include a method for the in-situ preparation of an ionic comonomer from its chemical precursors, formed in a solution of styrene monomer. The method generally involves adding chemical precursors to a reaction vessel containing styrene monomer, allowing the comonomer to form and dissolve in the styrene monomer either by stirring or exposing to elevated temperatures, removing unwanted side products, and diluting the solution with styrene until a mixture useful for styrene polymerization is obtained.

Embodiments can include a method for the in-situ preparation of zinc dimethacrylate dissolved in styrene monomer. The zinc methacrylate product may then be used as an ionic comonomer for the production of polystyrene, such as general purpose polystyrene. The method of in-situ preparation generally includes combining zinc oxide and methacrylic acid in a solution of styrene monomer and nonionic surfactant, and stirring until dissolved, allowing for the formation of an ionic comonomer that is soluble in styrene.

In one embodiment, the ionic comonomer is zinc dimethacrylate. According to the same embodiment, the chemical precursors used are zinc oxide, ZnO, and methacrylic acid, $CH_2=C(CH_3)-COOH$. The precursors can be added to the styrene monomer in a zinc to methacrylic acid molar ratio from 1:1 to 1:20 or more. In an embodiment the zinc to methacrylic acid molar ratio can range from 1:2 to 1:10.

Zinc oxide and methacrylic acid can be added in a molar ratio of approximately 1 molar equivalent of zinc per two molar equivalents of methacrylic acid, such that the reaction product is zinc dimethacrylate. Zinc dimethacrylate can function as an ionic comonomer and a crosslinking agent in the polymerization of styrene. Because zinc is a divalent metal, it can form up to two reversible crosslinks with the ionized acid ends of methacrylate which are incorporated into polystyrene chains. In-situ formed zinc dimethacrylate can be added to styrene monomer, resulting in a reaction mixture that is pumpable and pourable and can be easily transported to the reaction chamber. The reaction mixture may be polymerized via any method known in the art. The resulting polymer may have increased melt strength and glass transition temperature.

The present invention includes a method for the in-situ preparation of zinc dimethacrylate in a solution of styrene monomer, for use in the production of polystyrene. The method generally involves adding zinc oxide, ZnO, and methacrylic acid, $CH_2=C(CH_3)-COOH$, to a solution of styrene monomer and nonionic surfactant, and stirring at ambient temperature until dissolved, leading to the formation of an ionic comonomer that is soluble in styrene. Zinc oxide and methacrylic acid react according to Equation 1.

$$ZnO + 2CH_2=C(CH_3)COOH \rightarrow Zn[CH_2=C(CH_3)COO]_2 + H_2O$$ Equation 1

The production of water can be a problem for polystyrene production, since only ~0.1% is generally tolerated in a typical styrene polymerization process. The layer of water which can form at the bottom of the reaction vessel must be drained. One method that may be useful for removing water is by passing the zirconium methacrylate solution in styrene through a dehydration process to remove the water content, such as by passing the zirconium methacrylate solution in styrene through an alumina bed. The water produced from the above reactions should not become a problem within the process if the loading of the zinc dimethacrylate is no more than 2000 ppm in the styrene monomer.

The molar ratio of zinc to methacrylic acid can be varied, for example from 1:1 to 1:20. Alternately molar ratio of zinc to methacrylic acid in the chemical precursors can range from 1:2 to 1:6.

EXAMPLE

As an example of the method of the present invention, six solutions of ZnDMA dissolved in styrene monomer were prepared. In each preparation, zinc oxide 99%, obtained from Aldrich, was suspended in styrene monomer in a 0.5 L reaction kettle and stirred at 300 rpm with a mechanical stirrer using a crescent shaped blade. Nonionic surfactants were added to the reaction mixtures. The nonionic surfactants used were Triton X100 or a mixture of three nonionic surfactants, Triton X100, Triton X15, and Triton X45, all obtained from Dow Chemical. Methacrylic acid was added in one portion. In Preparation #1, the temperature in the reaction vessel rose to 32° C. during addition of the acid and then decreased to ambient temperature of 22° C. The other five preparations were carried out with twice the amount of styrene as was used in Preparation #1, and a flat blade was used. The mixtures were allowed to stir at ambient temperature (22° C.-25° C.) for 23 hours.

At the end of this period, the reaction mixtures were homogeneous suspensions without solid chunks. Only Preparation #1 yielded a thick, white paste with some visible small chunks of remaining zinc oxide. Apparently, the mixture was too thick to ensure efficient mixing; thus, for the other preparations, the amount of styrene was increased with the amount of surfactant adjusted to maintain the concentration. A sample taken from Preparation #1 was mostly soluble in styrene but formed a cloudy solution. Samples taken from the other preparations were completely soluble in styrene. Preparations that were made using surfactant remained homogenous and uniform without sedimentation, even after one month of storage. Preparation #6, which did not include surfactant, showed separation after one month of storage, with an upper layer of clear liquid. Table 1 shows the amounts of reagents used in Preparations #1 through 6.

TABLE 1

Recipes for In-situ Prepared ZnDMA

| Preparation No. | Styrene Charge (g) | ZnO Charge (g) | Methacrylic Acid Charge (g) | Surfactant | Surfactant Charge (g) |
|---|---|---|---|---|---|
| 1 | 195.5 | 16.40 | 33.600 | Triton X100 | 0.165 |
| 2 | 391.0 | 16.40 | 33.600 | Triton X100 | 0.330 |
| 3 | 391.0 | 16.40 | 38.173 | Tritons mix* | 0.330 |
| 4 | 391.0 | 16.40 | 39.908 | Tritons mix* | 0.330 |
| 5 | 391.0 | 16.40 | 33.600 | Tritons mix* | 0.330 |
| 6 | 391.0 | 16.40 | 33.600 | None | 0 |

*Triton X100, Triton X45 and Triton X15, 0.11 g of each

In all six preparations, the molar ratio of ZnO to methacrylic acid was nearly 1:2. Thus, the product of the reaction in all cases should have been zinc dimethacrylate, in accordance with Equation 1. FIG. 1 shows a proton NMR spectrum of the ZnDMA obtained in Preparation #5. The spectrum confirms that the desired product, ZnDMA, was formed. Only methyl and vinyl proton signals are present, characteristic of the hydrated and anhydrous forms of ZnDMA. The hydrated forms of ZnDMA generally include needles and powder, while the anhydrous forms generally include plates and fibers. The plate form is thought to be the form most likely to yield enhanced physical properties such as higher melt strength. Because water is a side product of the reaction (see Equation 1), the resultant ZnDMA can be partially in the hydrated form.

FIG. 2 shows an infrared spectrum of the ZnDMA of Preparation #5, with the spectrum of ZnO superimposed. Trace 1, for ZnDMA, shows none of the peaks characteristic of ZnO (Trace 2), indicating complete conversion of ZnO to ZnDMA. Trace 1 shows absorption at 1,700 cm$^{-1}$ characteristic of ZnDMA's carboxylic group and 2,900 cm$^{-1}$ due to $CH_2$ stretching.

Figure 3C:
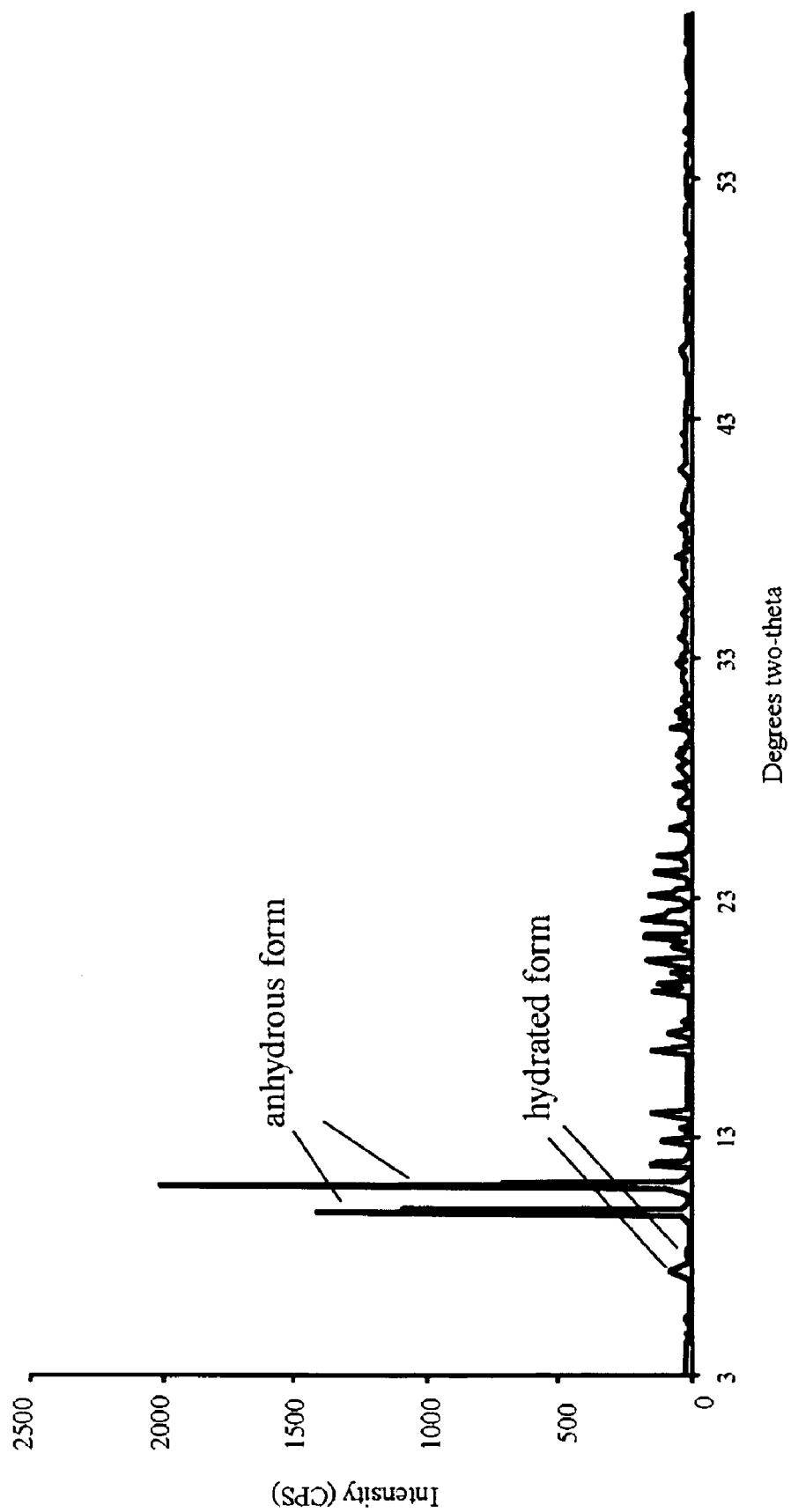

FIG. 3a-c show x-ray diffraction spectra of ZnO of Preparation #5 (FIG. 3a), ZnDMA of Preparation #2 (FIG. 3b), and ZnDMA obtained commercially from Sartomer (FIG. 3c). Comparison of FIG. 3a to FIG. 3b confirms the complete consumption of ZnO and conversion of ZnO to ZnDMA in Preparation #2, as FIG. 3b does not show the peaks characteristic of ZnO. Comparison of FIG. 3b to 3c shows that the ZnDMA of Preparation #2 is similar to the commercial ZnDMA obtained from Sartomer. Unlike FIG. 3c, FIG. 3b shows peaks characteristic of the hydrated form of ZnDMA crystal.

As a continuation of the example of the method according to the present invention, Preparations #1 through 6 were used to make GPPS. ZnDMA obtained from two commercial sources (Aldrich, Sartomer) were also used as controls. Crystal polystyrene was made by batch polymerization at 131° C. using 170 ppm of LUPERSOL® 233 catalyst (L-233) as initiator. Zinc dimethacrylate was added to the polymerization vessel in solution form in the case of Aldrich and Sartomer raw materials. These solutions were prepared in a separate vial using part of the styrene as a solvent, approximately 20 to 30 ml. When in-situ prepared ZnDMA slurry was used, aliquots containing 800 ppm of ZnDMA calculated on the basis of a quantitative yield were added, without first dissolving the materials in the vial prior to addition to the polymerization kettle. As is standard, the reactions were run to seventy percent solids. Expectedly, styrene conversions versus reaction time were similar to typical batch crystal PS runs. As shown in Table 2, the properties of the resultant polymers were comparable to those using commercially available ZnDMA.

TABLE 2

Physical Properties of PS Prepared with in-situ and commercial materials ZnDMA.

| ZnDMA Charge (ppm) | Preparation No. | ZnDMA Source | MFI (g/10 min) | Melt Strength (N) | Tg (° C.) |
|---|---|---|---|---|---|
| 800 | N/A | Aldrich, dry | 1.36 | 0.064 | 107.8 |
| 800 | N/A | Sartomer, dry | 1.80 | 0.057 | 108.9 |
| 800 | 1 | in-situ | 1.35 | 0.050 | 109.0 |
| 800 | 2 | in-situ | 0.92 | 0.092 | 108.6 |
| 800 | 3 | in-situ | 1.21 | 0.069 | 111.2 |
| 800 | 4 | in-situ | 1.06 | 0.067 | 112.2 |
| 800 | 5 | in-situ | 1.22 | 0.065 | 111.3 |
| 800 | 6 | in-situ | 1.23 | 0.053 | 110.8 |

As can be seen from Table 2, the melt strength grades and glass transition temperatures of the polymers made from Preparations #1 through 6 are comparable, and in some cases, higher, than the melt strength grades and glass transition temperatures of the polymers made using commercially obtained ZnDMA.

Another example of the method according to the present invention was carried out to demonstrate the reproducibility of the procedure. Preparation #7 was made by suspending 16.4 g of Zinc oxide 99%, obtained from Aldrich, in 391 g of styrene monomer in a 0.5 L reaction kettle and stirring at 150 rpm with a mechanical stirrer using a flat paddle. Ionic surfactant, 0.33 g of Triton X (Aldrich), was added to the reaction mixture. Methacrylic acid, 33.6 g, was added in one portion. As in Preparations #1 through 6, the molar ratio of ZnO to methacrylic acid was nearly 1:2. The reaction mixture was allowed to stir at ambient temperature (22° C.-25° C.) for 23 hours. At the end of this period reaction mixture was a homogeneous suspension without solid chunks. A sample taken from Preparation #7 was completely soluble in styrene.

Crystal polystyrene was made by batch polymerization at 131° C. using 170 ppm of L-233. In-situ prepared ZnDMA slurry was used in aliquots containing 400-1200 ppm of ZnDMA calculated on the basis of a quantitative yield. ZnDMA was added as solution in styrene, dissolving the materials in the vial prior to addition to the polymerization kettle. As is standard, the reactions were run to seventy percent solids. Styrene conversions versus reaction time were similar to typical batch crystal PS runs. Table 3 shows the physical properties of the polymers prepared using Preparation #7.

TABLE 3

Melt flow rates, melt strength measurements and molecular weights for GPPS made using in-situ produced ZnDMA of Preparation #7.

| ZnDMA loading | ppm | 400 | 419 | 629 | 861 | 1120 |
|---|---|---|---|---|---|---|
| GPC | Mn | 119906 | 133790 | 137187 | 125746 | 134072 |
|  | Mw | 273718 | 281570 | 288479 | 285275 | 291815 |
|  | Mz | 424557 | 432701 | 443233 | 441140 | 446072 |
|  | Polydispersity | 2.3 | 2.1 | 2.1 | 2.3 | 2.2 |
| MELT STRENGTH | Force, N | 0.037 | 0.045 | 0.044 | 0.075 | 0.107 |
| MFI | g/10 min | 1.48 | 1.45 | 1.29 | 0.94 | 0.70 |

Figure 4:
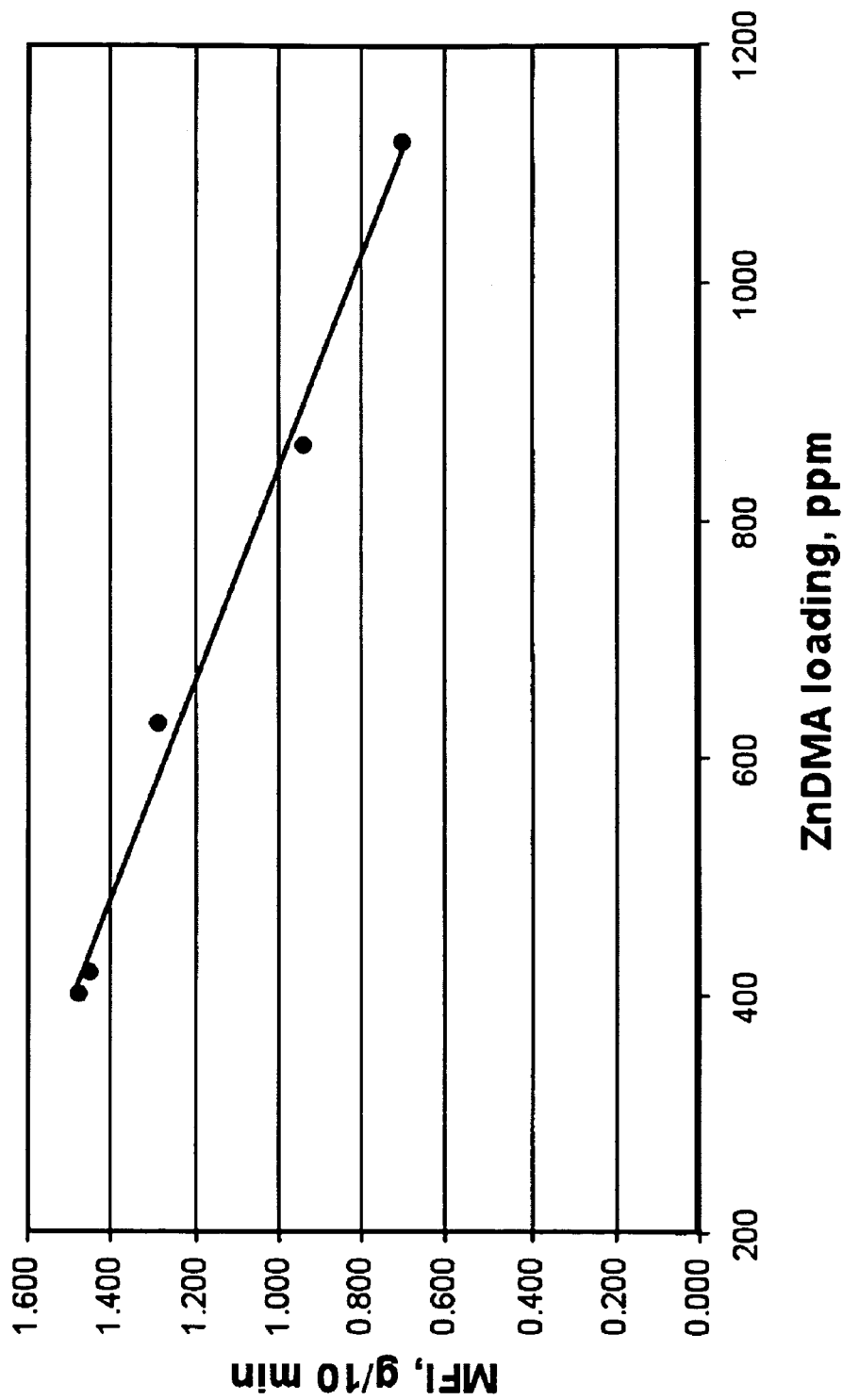
FIG. 4 illustrates the relationship between loading of in-situ formed ZnDMA and polystyrene melt flow rate.

As can be seen from Table 3, standard 800 ppm loading of ZnDMA gave a melt strength of the resulting ionomeric polystyrene product above 0.07 N. The Aldrich and Sartomer commercial products gave melt strength measurements 0.064 and 0.057 N, which makes in-situ produced ZnDMA at least as efficient as commercial products. Table 3 also indicates that melt flow rate decreases with increasing ZnDMA loading. FIG. 4 shows the linear relationship between ZnDMA loading and melt flow rate. ZnDMA loading, in ppm, appears on the x-axis, and melt flow rate of polystyrene appears on the y-axis.

Figure 5:
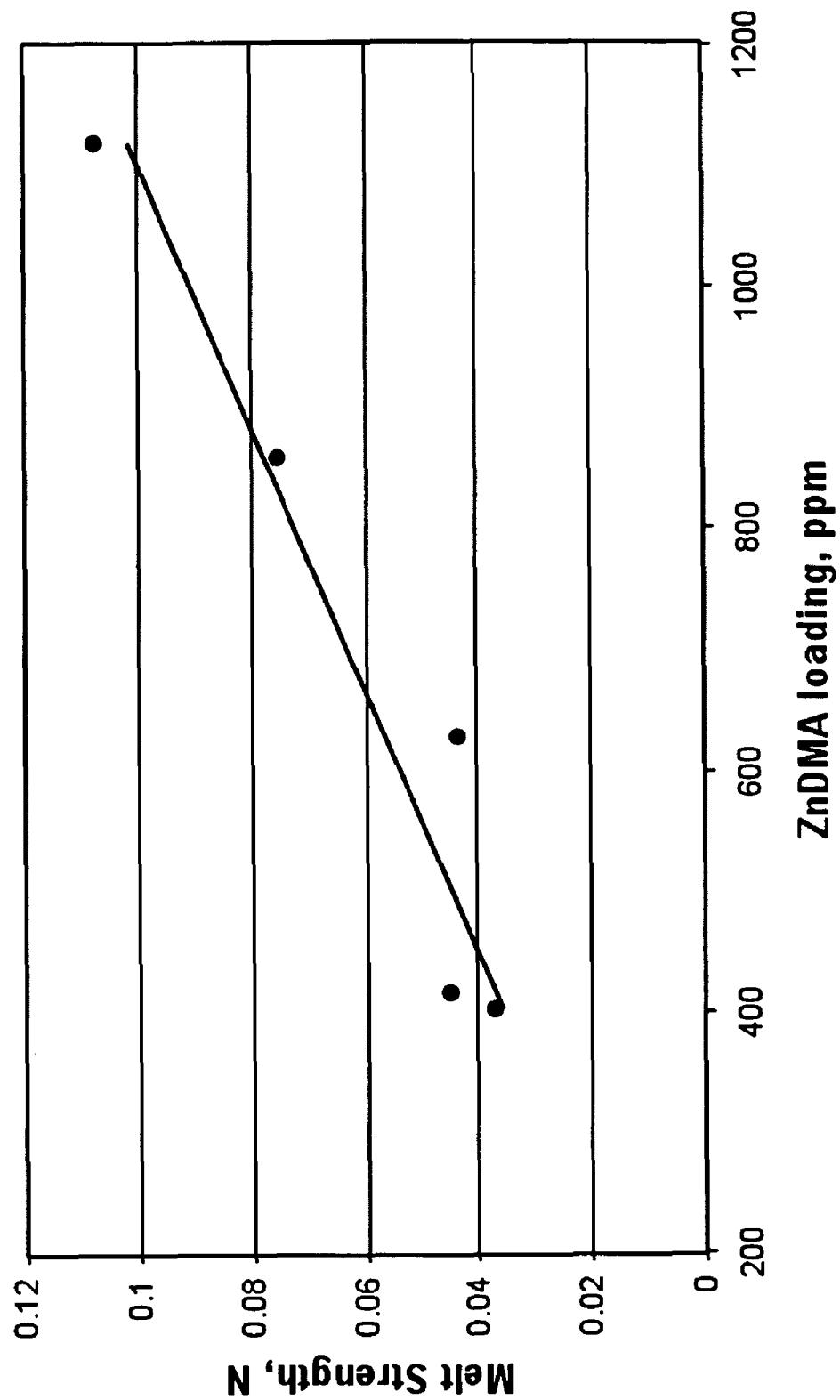
FIG. 5 illustrates the relationship between loading of in-situ formed ZnDMA and polystyrene melt strength.
Figure 6:
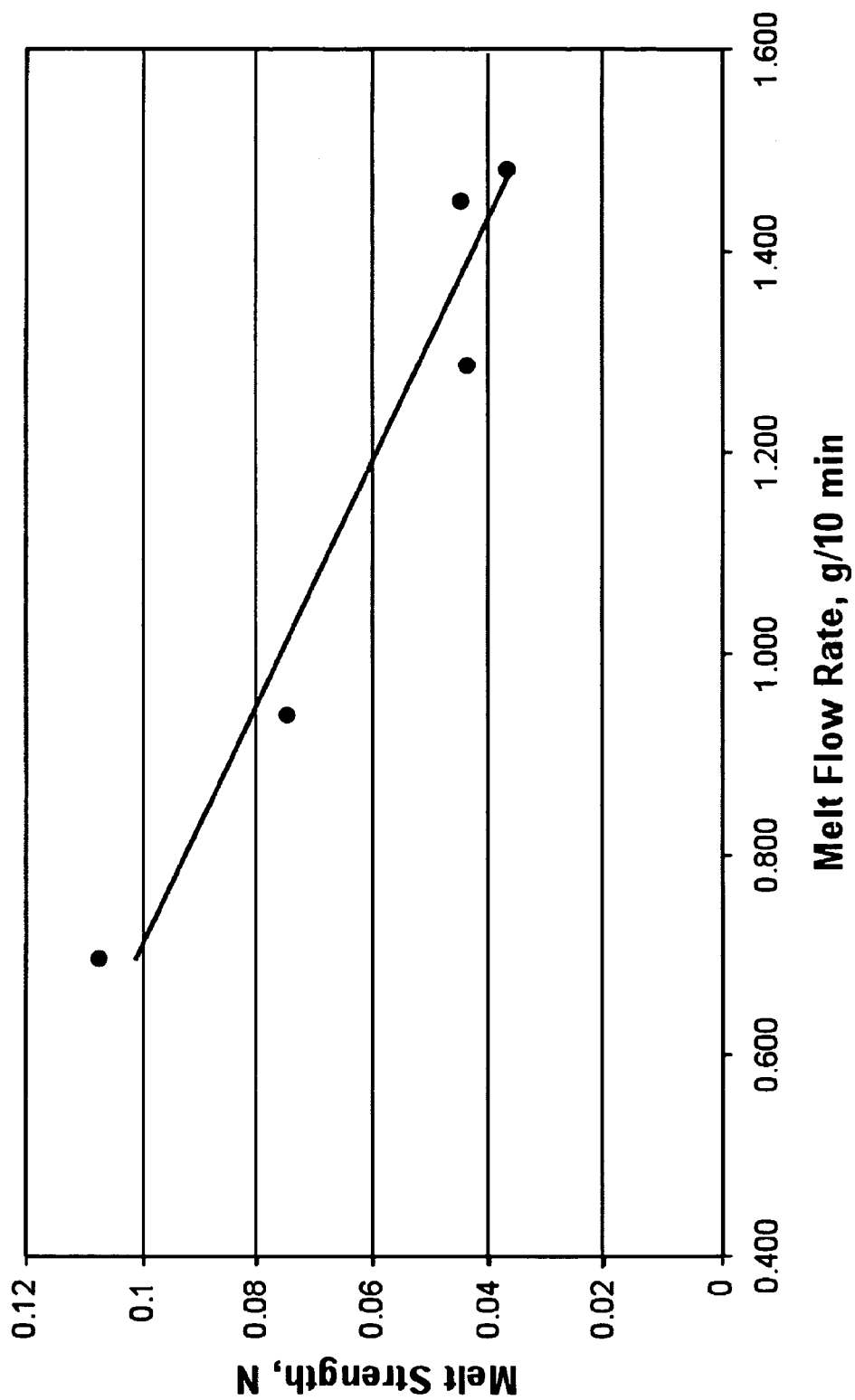
FIG. 6 illustrates the relationship between melt flow rate and melt strength for polystyrene made with in-situ formed ZnDMA.

FIG. 5 shows the linear relationship between ZnDMA loading and melt strength of polystyrene. Melt strength consistently increases with increasing ZnDMA loading. Because ZnDMA loading exhibits a linear relationship with both melt flow rate and melt strength, melt flow rate can be measured and used to predict melt strength. FIG. 6 plots the relationship between melt strength and melt flow rate, with melt flow rate on the x-axis and melt strength on the y-axis. Established linear dependence of melt strength on melt flow rate allows melt strength estimation by fast and simple melt flow rate measurement tests.

The examples given in Preparations #1 through 7 show that ZnDMA prepared in-situ is readily dissolvable is styrene and produces a solution that is both pumpable and pourable, allowing for simple transport to the reaction chamber. GPPS made from in-situ prepared ZnDMA shows strength characteristics as good as or better than commercial ZnDMA. The procedure is dust-free, and can be highly reproducible. The in-situ technique produced ZnDMA that did not require isolation and drying of the product, and therefore has less insolubles in styrene than commercial ZnDMA.

Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed is:

1. A method for the in-situ preparation of an ionic comonomer in styrene monomer comprising:
   contacting chemical precursors of an ionic comonomer in a reaction vessel containing styrene monomer; and
   producing a first product comprising the ionic comonomer in solution with the styrene monomer;
   wherein the chemical precursors of the ionic comonomer are zinc oxide, ZnO, and methacrylic acid, $CH_2\!=\!C(CH_3)\!-\!COOH$.

2. The method of claim 1, further comprising:
   facilitating the formation of the first product via stirring, elevated temperature, or a combination thereof.

3. The method of claim 1, further comprising:
   diluting the first product by adding additional styrene monomer.

4. The method of claim 1, wherein the ionic comonomer is a zinc based methacrylate.

5. The method of claim 1, wherein the chemical precursors are added in a molar ratio of zinc to methacrylic acid from 1:1 to 1:20.

6. The method of claim 1, wherein the chemical precursors are added in a molar ratio of zinc to methacrylic acid from 1:1 to 1:10.

7. The method of claim 1, wherein water produced as an unwanted side product is removed from the first product.

8. The method of claim 7, wherein water produced as an unwanted side product is removed from the first product by passing the reaction mixture through a dehydration process.

9. The method of claim 7, wherein water produced as an unwanted side product is removed from the first product by passing the reaction mixture over an alumina bed.

10. A method for the in-situ preparation of an ionic comonomer in styrene monomer comprising:
    contacting zinc oxide, ZnO, and methacrylic acid, $CH_2\!=\!C(CH_3)\!-\!COOH$, in a molar ratio of zinc to methacrylic acid from 1:1 to 1:20, in a reaction vessel containing styrene monomer; and
    producing a first product comprising zinc dimethacrylate, $Zn[CH_2\!=\!C(CH_3)COO]_2$, in solution with the styrene monomer.

11. The method of claim 10, wherein water produced as an unwanted side product is removed from the first product.

12. The method of claim 10, further comprising:
    facilitating the formation of the first product via stirring, elevated temperature, or a combination thereof.

13. The method of claim 10, further comprising:
    diluting the first product by adding additional styrene monomer.

14. The method of claim 10, wherein the zinc oxide and methacrylic acid are added in a molar ratio of zinc to methacrylic acid from 1:1 to 1:6.

* * * * *